(12) United States Patent
Eells et al.

(10) Patent No.: US 10,176,215 B2
(45) Date of Patent: Jan. 8, 2019

(54) DATA CURRENCY IMPROVEMENT FOR CROSS-SITE QUERIES

(71) Applicant: International Business Machines Corporation, Armonk, NY (US)

(72) Inventors: John R. Eells, Pleasant Valley, NY (US); David B. Petersen, Great Falls, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 311 days.

(21) Appl. No.: 14/950,970

(22) Filed: Nov. 24, 2015

(65) Prior Publication Data
US 2017/0147625 A1 May 25, 2017

(51) Int. Cl.
*G06F 17/30* (2006.01)
*H04L 29/08* (2006.01)

(52) U.S. Cl.
CPC .. *G06F 17/30371* (2013.01); *G06F 17/30575* (2013.01); *H04L 67/1095* (2013.01)

(58) Field of Classification Search
CPC ......... G06F 17/30371; G06F 17/30545; G06F 17/30144; G06F 17/3056; G06F 17/30575
USPC ........................................................ 707/615
See application file for complete search history.

(56) References Cited

U.S. PATENT DOCUMENTS

| | | | |
|---|---|---|---|
| 7,523,213 B1 * | 4/2009 | Shen | ................. G06F 17/30303 707/999.202 |
| 8,458,150 B2 | 6/2013 | Holenstein | |
| 8,838,919 B2 | 9/2014 | Shi | |
| 2007/0083521 A1 | 4/2007 | Diedrich | |
| 2010/0017460 A1 * | 1/2010 | Shen | ...................... G06F 9/505 709/203 |
| 2013/0166505 A1 | 6/2013 | Peretz | |

(Continued)

OTHER PUBLICATIONS

Gançarski, Stéphane, et al., "The Leganet System: Freshness-Aware Transaction Routing in a Database Cluster," Information Systems 32, No. 2, 2007, pp. 320-343.

(Continued)

*Primary Examiner* — Monica M Pyo
(74) *Attorney, Agent, or Firm* — Cantor Colburn LLP; William A. Kinnaman, Jr.

(57) ABSTRACT

A computer program product is provided for data currency improvement in a system having data sites running first and second applications within a common operating system hosted on a real or virtualized server and includes a computer readable storage medium having sequences of program instructions. The sequences of program instructions are readable and executable by a processing circuit to cause the processing circuit to establish first and second sites as active standby and active query sites, respectively, direct first and second transactions of the first application to the first site and to at least the second site, respectively, monitor replication delays from times at which data updates occur at the first site to times at which the data updates are replicated at least at the second site and set a delay for responding to the second transactions of the first application in accordance with the monitoring independent of a setting of any delay for responding to second application requests.

17 Claims, 4 Drawing Sheets

(56) References Cited

U.S. PATENT DOCUMENTS

2014/0188801 A1* 7/2014 Ramakrishnan .. G06F 17/30575
707/634
2014/0236891 A1 8/2014 Talius
2015/0263909 A1* 9/2015 Okubo .................... H04L 43/10
709/224

OTHER PUBLICATIONS

Krikellas, Konstantinos, et al., "Strongly Consistent Replication for a Bargain," 2010 IEEE 26th International Conference on Data Engineering (ICDE), pp. 52-63, IEEE, 2010.
Zhao, Liang, et al., "Application-Managed Replication Controller for Cloud-Hosted Databases," 2012 IEEE 5th International Conference on Cloud Computing (CLOUD), pp. 922-929, IEEE, 2012.
Mel, Peter, et al., "The NIST Definition of Cloud Computing," National Institute of Standards and Technology, 7 pages, Sep. 2011.

* cited by examiner

DATA CURRENCY IMPROVEMENT FOR CROSS-SITE QUERIES

BACKGROUND

The present invention relates to data currency improvement and, more specifically, to a method of data currency improvement for cross-site queries when using asynchronous data mirroring technologies.

A number of information technology (IT) installations are replicating data to multiple sites that may be remote from each other. This is done for a number of reasons, including, but not limited to, maintaining current or near-current data at a secondary site so that recovery from unscheduled site outages can be done more quickly. As the distance between sites increases, however, the use of synchronous data replication technologies becomes impractical because the replication delays result in long transaction times that are unacceptable. Therefore, at greater distances asynchronous replication technologies are usually deployed.

The creation of a secondary site is often expensive and represents a duplication of all the hardware and software needed to support a number of applications with respect to a primary site. Furthermore, restricting all read and update activity to a single site burdens the originating site with the preponderance of the workload while the secondary site or sites are often lightly-loaded. To counteract this, an enterprise can choose to allow read activity from all sites while restricting write activity to a single site, or even to allow unrestricted multi-site read/write activity.

Because there is an inherent replication delay involved in transmitting data from one site to another, it is possible for a write transaction to be processed at one site and a subsequent query (read) transaction to be processed at another site before the replication occurs. When this happens, the query transaction data is outdated.

SUMMARY

According to an embodiment of the present invention, a computer program product is provided for data currency improvement in a computing system having multiple replicated data sites running first and second applications within a common operating system hosted on a real or virtualized server. The computer program product includes a computer readable storage medium having sequences of program instructions embodied therewith which are readable and executable by a processing circuit to cause the processing circuit to establish a first site and a second site as an active standby site and as an active query site, respectively, direct first transaction class requests and second transaction class requests of the first application to the first site and to at least the second site, respectively, monitor replication delays from times at which data updates occur at the first site to times at which the data updates are replicated at least at the second site and set a transaction delay for responding to the second transaction class requests of the first application, which are directed to the second site, in accordance with the monitoring of the replication delays independent of a setting of any delay for responding to requests of the second application.

According to another embodiment of the present invention, a computing system for data currency improvement is provided. The computing system includes multiple replicated data sites running first and second applications within a common operating system hosted on a real or virtualized server and a computer readable storage medium having instruction sequences stored thereon that are executable by a processing circuit to cause the processing circuit to establish a first site and a second site as an active standby site and as an active query site, respectively, direct first transaction class requests and second transaction class requests of the first application to the first site and to at least the second site, respectively, monitor replication delays from times at which data updates occur at the first site to times at which the data updates are replicated at least at the second site and set a transaction delay for responding to the second transaction class requests of the first application, which are directed to the second site, in accordance with the monitoring independent of a setting of any delay for responding to second application requests.

According to yet another embodiment of the present invention, a computer-implemented method is provided for improving data currency in a computing system including multiple replicated data sites running first and second applications within a common operating system hosted on a real or virtualized server. The computer-implemented method includes establishing a first site and a second site as an active standby site and as an active query site, respectively, directing first transaction requests and second transaction class requests of the first application to the first site and to at least the second site, respectively, monitoring replication delays from times at which data updates occur at the first site to times at which the data updates are replicated at least at the second site and allowing the first application to set a transaction delay for responding to the second transaction class requests of the first application, which are directed to the second site, in accordance with the monitoring independent of a setting of any delay for responding to second application requests.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As will be described below, a workload manager selectively imposes delays on transaction processing. Cross-site continuous availability/disaster recovery solutions, such as active/active (A/A) sites, provide transaction routing software and can monitor replication delays. The workload manager may have an interface, such as a programming interface, which accepts input from cross-site transaction routing software to set a transaction delay that exceeds the replication delay by a set amount of time for specified classes of transaction processing. Together, they can dramatically reduce the probability that a query (read) transaction initiated at a site other than the one at which an update transaction occurs will return outdated information.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
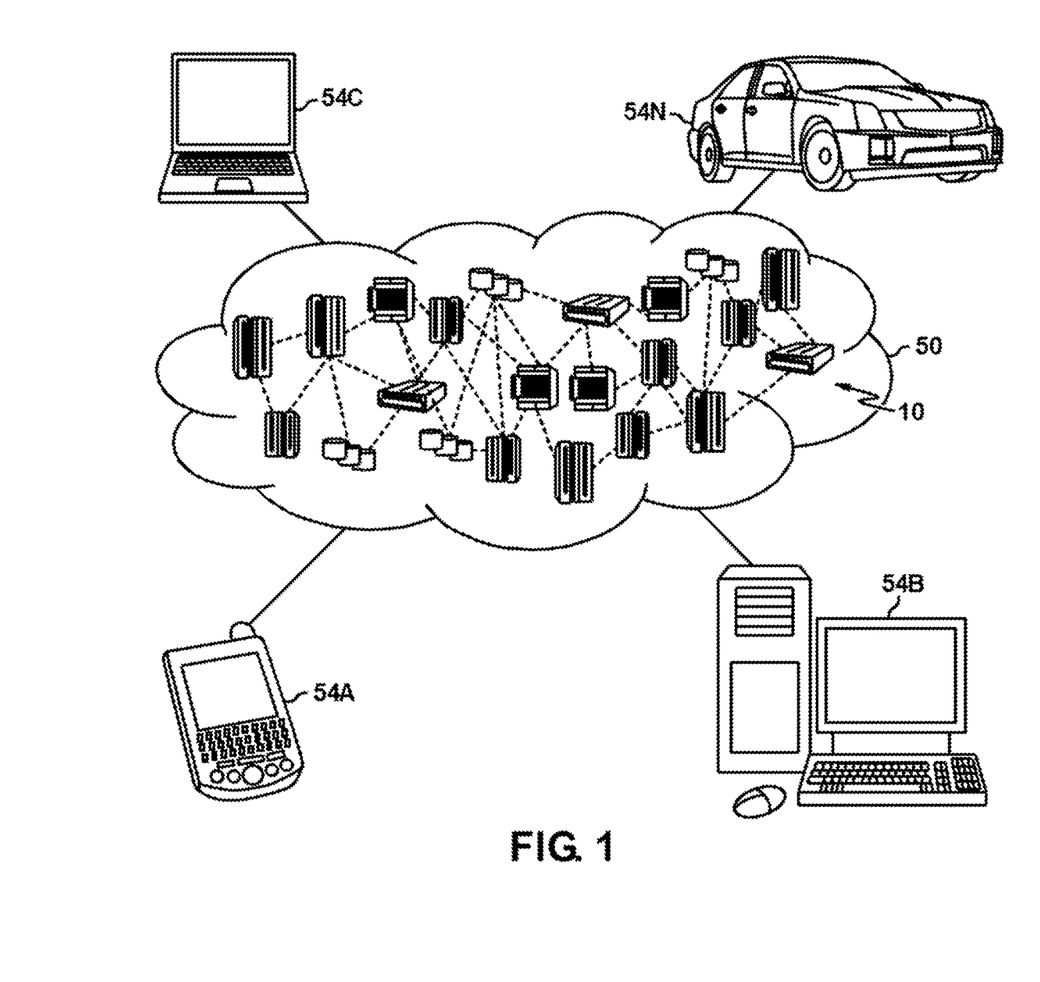
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C and/or automobile computer system 54N may communicate. Nodes 10 may communicate with one another. They may be grouped (not shown) physically or virtually, in one or more networks, such as Private, Community, Public or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
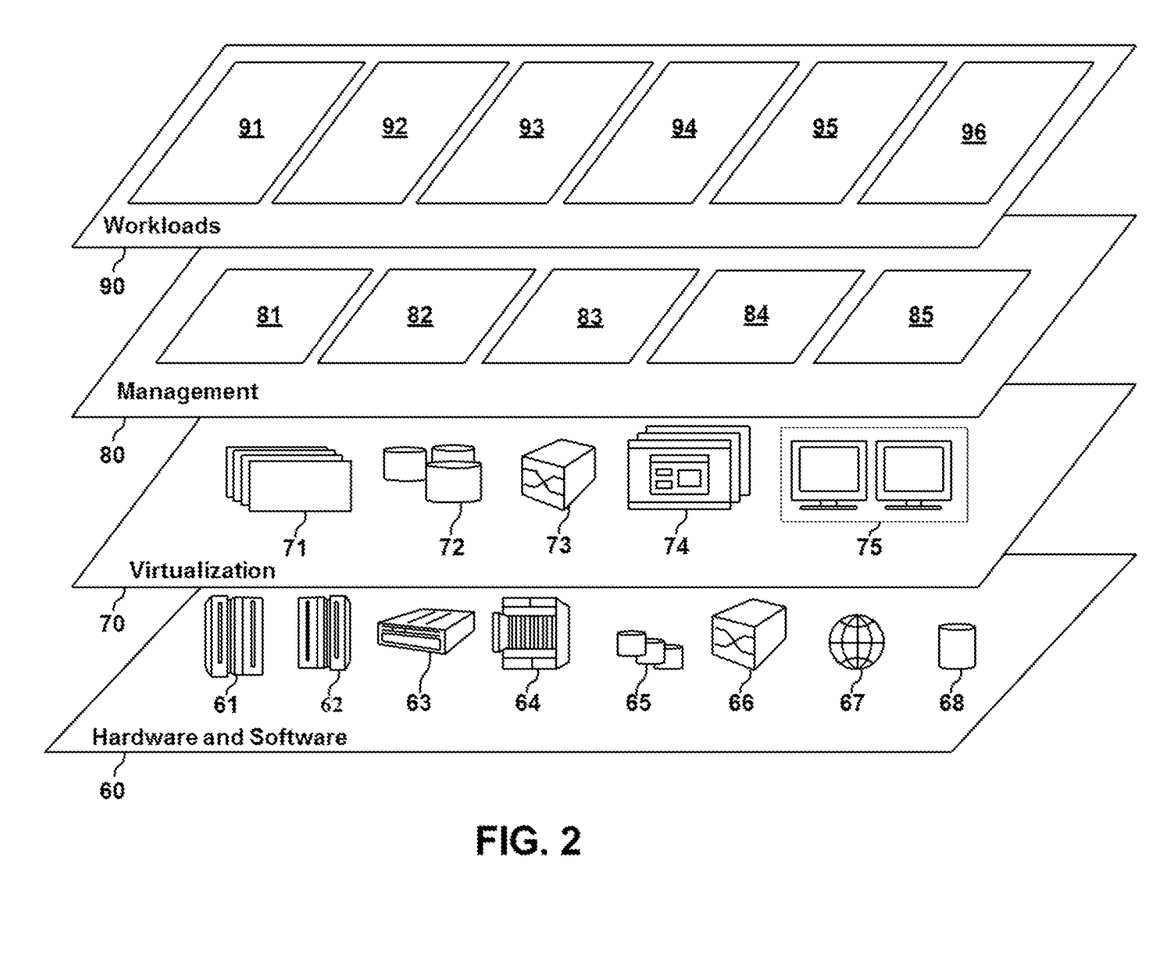
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 serve to provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a mobile desktop computing 96.

Figure 3:
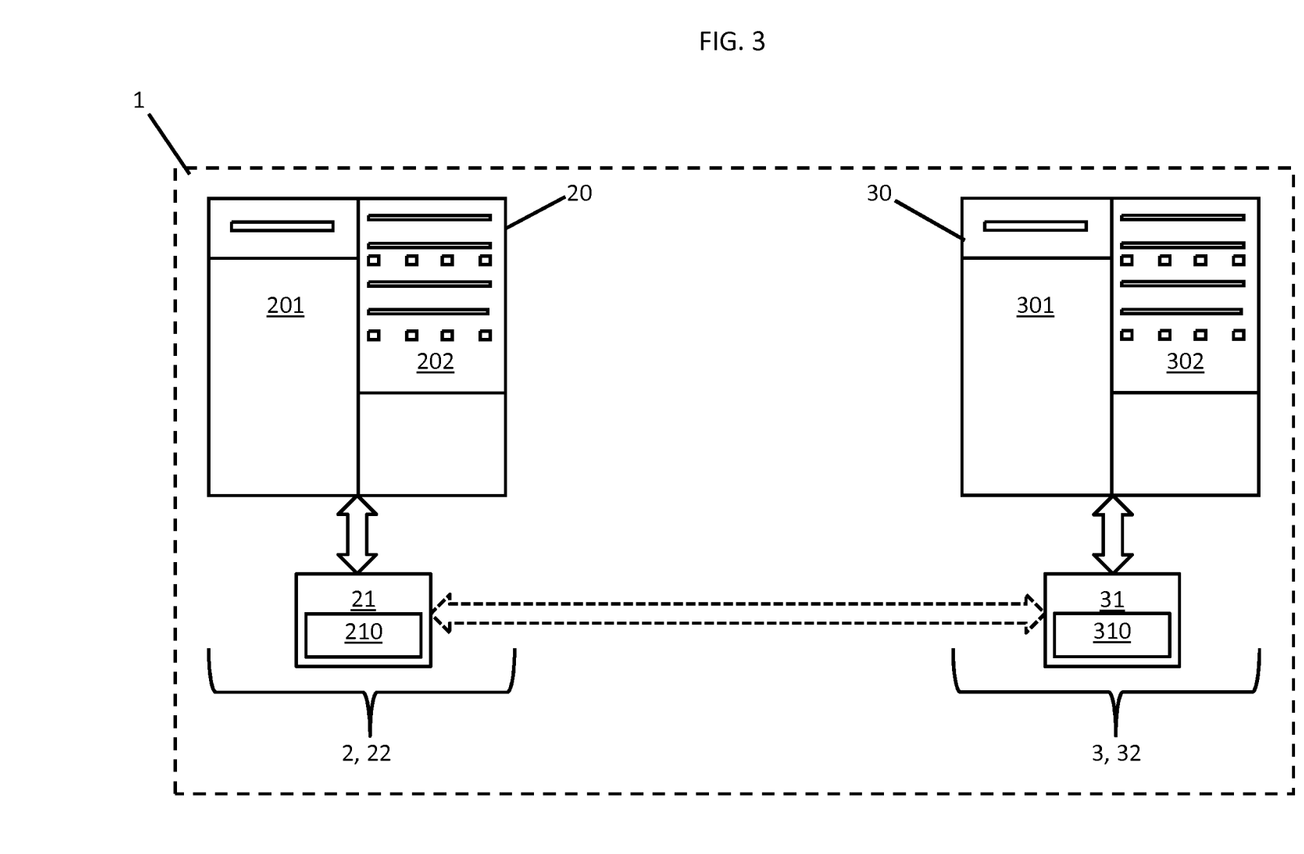
FIG. 3 is a schematic diagram illustrating a computing system for data currency improvement in accordance with embodiments.
Figure 4:
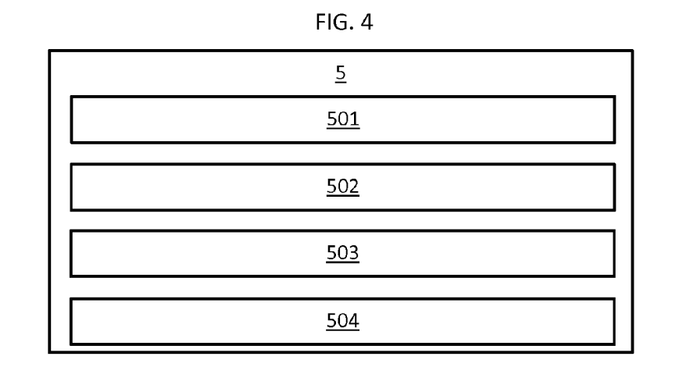
FIG. 4 is a schematic diagram illustrating program instructions of a computer program product for data currency improvement.
Figure 5:
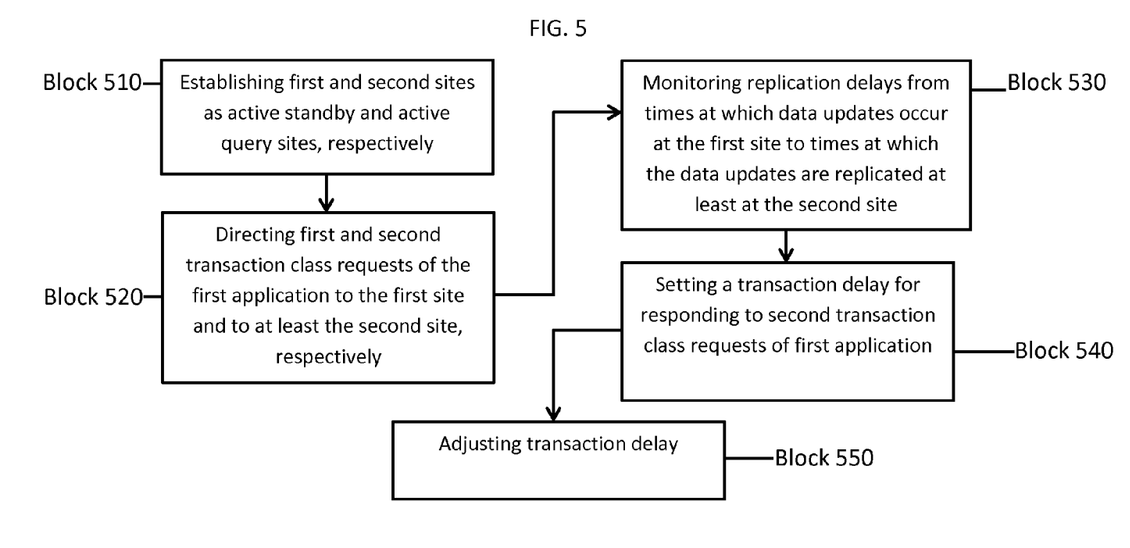
FIG. 5 is a flow diagram illustrating a computer-implemented method of data currency improvement.

In accordance with embodiments and, with reference to FIGS. 3-5, the transaction processing 95 includes a dynamic monitoring of replication delays and the imposition of corresponding delays on selected transactions to reduce the probability that stale data will be returned for those selected transactions. It could be implemented, for example, in computing system 1 of FIG. 3 in which a first site 2 and a second site 3 are provided for multi-site data replication. The first site 2 may include a server or host element 20 that is coupled to a router 21 by which various types of transaction class requests are directed to the server or host element 20. The second site 3 may similarly include a server or host element 30 that is coupled to a router 31 by which various types of transaction class requests are directed to the server or host element 30. The server or host element 20 of the first and second sites 2 and 3 includes a processing circuit 201/301 and a memory unit 202/302. The memory unit 202/302 has computer readable instructions stored thereon, which, when executed cause the processing circuit 201/301 to execute certain algorithms that will be described herein. The routers 21 and 31 are connected to each other by way of network 4.

In accordance with embodiments, the computer readable instructions stored in the memory unit 202/302 may be embodied as a computer program product 5 (see FIG. 4) for data currency improvement in the computing system 1 where the first and second sites 2 and 3 are active/active (A/A) sites and are instances of multiple replicated data sites that are configured to run first and second applications within a common operating system hosted on a real or virtualized server. In accordance with embodiments, at least the first application may be provided as a banking or credit card application. As such, certain transactions of the first application may be classified as query-type transactions whereby a user queries certain information he may have access to without changing or updating such information (e.g., a current balance inquiry) whereas other transactions may be classified as read/write transactions in which data is changed (e.g., a transfer of funds). It is therefore necessary to have updated data available for a query-type transaction in order to insure that correct information is provided to the querying user.

Each of the multiple replicated data sites may run a similar and communicative operating system, such as IBM's z/OS™ operating system, and may thus define a workload manager (WLM) that controls and moderates workloads throughout the multiple replicated data sites in order to maintain a balanced workload at each individual site.

Within the operation of the operating system and, with reference to FIG. 4, the computer program product 5 has first and second sequences of program instructions 501 and 502 that are readable and executable by the processing circuit 201/301 to cause the processing circuit 201/301 to establish the first site 2 as an active standby site 22 and the second site as an active query site 32 and to direct first transaction class requests of the first application to the first site 2 and second transaction class requests to at least the second site 3, respectively. That is, in the example given above where the first application is a banking or credit card application, the first site 2 is provided for processing data updates and queries and the second site 3 is provided for processing queries. Thus, where the first transaction class requests are defined to include read/write requests and where the second transaction class requests are defined to include read requests, the first transaction class requests are directed by the WLM to the first site 2 for processing and the second transaction class requests are directed by the WLM to the second site 3 for processing.

A third sequence of program instructions 503 of the computer program product 5 may cause the processing circuit 201/301 to control the routers 21 and 31 or cross-site transaction, routing and replication software 210, 310, which is installed within the routers 21 and 31, and which is communicative with the WLM via a programming interface. By way of such control, the routing and replication software 210, 310 monitors replication delays from times at which data updates occur at the first site 2 to times at which the data updates are replicated at least at the second site 3.

In accordance with embodiments, the replication delays arise from inherent delays involved in handling first and second transaction class requests and in transmitting data from any of the multiple replicated data sites to any of the other multiple replicated data sites. This is especially true in an exemplary case where the first site 2 and the second site 3 are geographically distant (e.g., first site 2 is in California and the second site 3 is in New York).

A fourth sequence of program instructions 504 of the computer program product 5 may cause the processing circuit 201/301 to set a transaction delay for responding to the second transaction class requests of the first application, which are directed to the second site 3, in order to dramatically reduce a probability that a second transaction class request at the second site 3 will return outdated information. Such a setting of the transaction delay would be in accordance with a result found from the monitoring of the replication delays and would be conducted at the application level as opposed to the server level. Therefore, the setting of the transaction delay is independent of a setting of any delay for any of the multiple replicated data sites to respond to requests of the second application.

In accordance with further embodiments, the transaction delay may be set to exceed an average replication delay as determined by for example the routers 21 and 31. Additionally or alternatively, the transaction delay may be set to exceed the average replication delay by a predetermined time period that insures that second transaction class requests at the second site 3 will not return outdated information. This predetermined time period may be manually or automatically set based on historical replication delay data and/or user preferences. In accordance with still further embodiments, the program instructions may be readable and executable by the processing circuit 201/301 to cause the processing circuit 201/301 to adjust the transaction delay based on historical replication delay data, current conditions, user preferences, etc., and to account for variations in the monitored replication delay data.

With reference to FIG. 5, a computer-implemented method for improving data currency in computing system 1 includes establishing at block 510 the first and second sites 2 and 3 as the active standby and active query sites, respectively, directing at block 520 the first and second transaction class requests of the first application to the first site 2 and to at least the second site 3, respectively, monitoring at block 530 the replication delays from times at which data updates occur at the first site 2 to times at which the data updates are replicated at least at the second site 3 and setting at block 540 the transaction delay for responding to the second transaction class requests of the first application, which are directed to the second site 3, in accordance with the monitoring independent of a setting of any delay for responding to second application requests. In accordance with embodiments, the setting of the transaction delay may include setting the transaction delay to exceed the average replication delay or to exceed the average replication delay by a predetermined period of time. In accordance with further embodiments, the computer-implemented method may also include adjusting at block 550 the transaction delay.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for data currency improvement in a computing system having multiple replicated data sites running first and second applications within a common operating system hosted on a real or virtualized server, the computer program product comprising a computer readable storage medium having sequences of program instructions embodied therewith which are readable and executable by a processing circuit to cause the processing circuit to:
   establish a first site and a second site, which is geographically distant from the first site, as an active standby site and as an active query site, respectively;
   direct first transaction class requests and second transaction class requests of the first application to the first site and to at least the second site, respectively;
   monitor replication delays from times at which data updates occur at the first site to times at which the data updates are replicated at least at the second site;
   set a transaction delay for responding to the second transaction class requests of the first application, which are directed to the second site, to exceed:
      transmission delays of transmissions between the geographically distant first and second sites, which arise from the geographic distance between the first and second sites, and
      an average of the replication delays as determined by routers handling the first and second transaction class requests independent of a setting of any delay for responding to requests of the second application;
   respond to the second class transaction requests of the first application following an expiration of the set transaction delay.

2. The computer program product according to claim 1, wherein the first application comprises a banking application.

3. The computer program product according to claim 1, wherein the first site processes data updates and queries and the second site processes queries.

4. The computer program product according to claim 1, wherein the first transaction class requests comprise read/write requests and the second transaction class requests comprise read requests.

5. The computer program product according to claim 1, further comprising routing and replication software configured to monitor the replication delays.

6. The computer program product according to claim 1, wherein the program instructions are readable and executable by the processing circuit to adjust the transaction delay based on historical delay data, current conditions and user preferences.

7. A computing system for data currency improvement, the computing system comprising multiple replicated data sites running first and second applications within a common operating system hosted on a real or virtualized server and a computer readable storage medium having instruction sequences stored thereon that are executable by a processing circuit to cause the processing circuit to:
   establish a first site and a second site, which is geographically distant from the first site, as an active standby site and as an active query site, respectively;

direct first transaction class requests and second transaction class requests of the first application to the first site and to at least the second site, respectively;

monitor replication delays from times at which data updates occur at the first site to times at which the data updates are replicated at least at the second site;

set a transaction delay for responding to the second transaction class requests of the first application, which are directed to the second site, to exceed:

transmission delays of transmissions between the geographically distant first and second sites, which arise from the geographic distance between the first and second sites, and an average replication delay as determined by routers handling the first and second transaction class requests independent of a setting of any delay for responding to second application requests; and respond to the second class transaction requests of the first application following an expiration of the set transaction delay.

8. The computing system according to claim 7, wherein the first application comprises a banking application.

9. The computing system according to claim 7, wherein the first site processes data updates and queries and the second site processes queries.

10. The computing system according to claim 7, wherein the first transaction class requests comprise read/write requests and the second transaction class requests comprise read requests.

11. The computing system according to claim 7, further comprising routing and replication software configured to monitor the replication delays.

12. The computing system according to claim 7, wherein the instructions are executable by the processing circuit to cause the processing circuit to adjust the transaction delay based on historical delay data, current conditions and user preferences.

13. A computer-implemented method for improving data currency in a computing system comprising multiple replicated data sites running first and second applications within a common operating system hosted on a real or virtualized server, the computer-implemented method comprising:

establishing a first site and a second site, which is geographically distant from the first site, as an active standby site and as an active query site, respectively;

directing first transaction class requests and second transaction class requests of the first application to the first site and to at least the second site, respectively;

monitoring replication delays from times at which data updates occur at the first site to times at which the data updates are replicated at least at the second site; and setting a transaction delay for responding to the second transaction class requests of the first application, which are directed to the second site, to exceed:

transmission delays of transmissions between the geographically distant first and second sites, which arise from the geographic distance between the first and second sites, and an average replication delay as determined by routers handling the first and second transaction class requests independent of a setting of any delay for responding to second application requests; and responding to the second class transaction requests of the first application following an expiration of the set transaction delay.

14. The computer-implemented method according to claim 13, wherein the first application comprises a banking application.

15. The computer-implemented method according to claim 13, wherein:

the first site processes data updates and queries and the second site processes queries, and the first transaction class requests comprise read/write requests for the data updates and the second transaction class requests comprise read requests for queries.

16. The computer-implemented method according to claim 13, wherein the monitoring is conducted by routing and replication software.

17. The computer-implemented method according to claim 13, further comprising adjusting the transaction delay based on historical delay data, current conditions and user preferences.

* * * * *